United States Patent [19]
Kudou et al.

[11] Patent Number: 5,649,457
[45] Date of Patent: Jul. 22, 1997

[54] PARK LOCK ARRANGEMENT FOR CONTINUOUSLY VARIABLE TRANSMISSION

[75] Inventors: Kiyoshi Kudou, Nagoya; Toshio Yamaguchi, Hadano; Hirofumi Okahara, Isehara, all of Japan

[73] Assignees: Nissan Motor Co., Ltd., Yokohama; Aichi Machine Industry Co., Ltd., Nagoya, both of Japan

[21] Appl. No.: 413,767

[22] Filed: Mar. 30, 1995

[30] Foreign Application Priority Data

Apr. 4, 1994 [JP] Japan .................................. 6-087240

[51] Int. Cl.$^6$ .................................................. B60K 41/26
[52] U.S. Cl. ........................ 74/606 R; 74/577 R; 475/210
[58] Field of Search .................... 74/500.5, 501.5 R, 74/575, 577 R, 577 M, 606 R; 475/210; 474/8, 28

[56] References Cited

U.S. PATENT DOCUMENTS

| | | | |
|---|---|---|---|
| 4,487,302 | 12/1984 | Morimoto et al. | 192/4 A |
| 4,493,403 | 1/1985 | Takano et al. | 74/411.5 |
| 4,606,242 | 8/1986 | Hasegawa et al. | 74/577 S |
| 4,645,046 | 2/1987 | Takano et al. | 192/4 A |
| 4,667,783 | 5/1987 | Sugano et al. | 74/411.5 |
| 4,671,133 | 6/1987 | Yamada | 74/577 S |
| 4,736,113 | 4/1988 | Yamamuro et al. | 74/866 |
| 5,179,868 | 1/1993 | Thibeault | 74/335 |
| 5,269,695 | 12/1993 | Kitagawara | 74/411.5 |
| 5,295,920 | 3/1994 | Sawasaki et al. | 74/606 R |

OTHER PUBLICATIONS

"Nissan Technical Handbook, March K11-1", Nissan Motor Co., Ltd., 1992.

*Primary Examiner*—Charles A. Marmor
*Assistant Examiner*—Mary Ann Battista
*Attorney, Agent, or Firm*—Foley & Lardner

[57] ABSTRACT

A park lock arrangement for use in a continuously variable transmission including a housing, an end cover and a casing having one end portion coupled with the housing and the opposite end portion coupled with the end cover. The casing has an inwardly recessed portion to define a reduced container space. A follower shaft supporting a follower pulley has one end portion rotatably supported on the end cover and the opposite end portion extending into the housing. A driver gear is mounted on the opposite end portion of the follower shaft. A parking gear is disposed on the follower shaft between the follower pulley and the driver gear. A control shaft extends through the reduced container space and has one end portion projecting outwardly from the inwardly recessed portion of the casing. The control shaft drivingly supports a park lock mechanism for locking the parking gear. The park lock mechanism is disposed within the reduced container space.

12 Claims, 5 Drawing Sheets

PARK LOCK ARRANGEMENT FOR CONTINUOUSLY VARIABLE TRANSMISSION

RELATED COPENDING APPLICATION

U.S. patent application Ser. No. 08/187,286 filed by Yoshiyasu MURAKAMI et al. on Jan. 27, 1994, now U.S. Pat. No. 5,480,361.

BACKGROUND OF THE INVENTION

The present invention relates to a park lock arrangement for use in a continuously variable transmission.

A publication entitled "NISSAN TECHNICAL HANDBOOK, MARCH K11-1, January, 1992" discloses a park lock arrangement for use in a continuously variable transmission. This known arrangement includes a housing, an end cover, and a casing coupled with the housing and the end cover at the opposite end portions. The known arrangement includes a direction change planetary gearing having an input shaft, and a continuously variable ratio change unit including a driver pulley mounted on a driver shaft coaxial with the input shaft. A follower shaft extends in parallel with the driver shaft and has one end portion rotatably supported on the end cover, the opposite end portion extending into the housing, and an intermediate portion therebetween. A follower pulley is disposed on the intermediate portion close to the one end portion of the follower shaft. A V-belt interconnects the driver and follower pulleys. A gear train is drivingly disposed between the continuously variable ratio change unit and a differential. A parking gear is formed integrally with the follower pulley and thus located closer to the one end portion of the follower shaft. A park lock mechanism is so arranged in the vicinity of the parking gear as to lock the parking gear. The park lock mechanism includes a pawl arranged to be engageable with the parking gear, an actuator operatively connected to the pawl, and a control shaft linked with the actuator and rotatably supported on the casing.

In such a prior art park lock arrangement, an assembling operation of the park lock mechanism should be conducted simultaneously with or in advance of a coupling operation of the casing with the end cover. In addition, since the parking gear formed integrally with the follower pulley has a relatively large diameter, it is required to provide a sufficiently large mounting space for the park lock mechanism within a vehicle body.

There is a demand for a park lock arrangement for use in a continuously variable transmission in which an assembling operation of the park lock mechanism can be carried out readily and separately from a coupling operation of the casing with the end cover.

An object of the present invention is to provide an improved park lock arrangement for use in a continuously variable transmission, which arrangement serves for an easy assembling operation.

Another object of the present invention is to provide a space-saving structure of the park lock arrangement for use in the continuously variable transmission, thereby serving to reduce size.

SUMMARY OF THE INVENTION

According to one aspect of the present invention, there is provided a park lock arrangement for use in a continuously variable transmission, comprising:

a housing;

an end cover;

a casing having one end portion coupled with the housing and the opposite end portion coupled with the end cover, the casing having an inwardly recessed portion to define a first reduced container space;

a direction change planetary gearing having an input shaft;

a driver shaft coaxial with the input shaft of the change direction planetary gearing;

a follower shaft extending in parallel relationship with respect to the driver shaft, the follower shaft having one end portion rotatably supported on the end cover, an intermediate portion rotatably supported on the casing, and the opposite end portion extending into the housing;

a continuously variable ratio change unit including a driver pulley mounted on the driver shaft, a follower pulley mounted on the follower shaft, and a V-belt interconnecting the driver pulley and the follower pulley;

a differential;

a gear train drivingly disposed between the continuously variable ratio change unit and the differential, the gear train including a driver gear mounted on the opposite end portion of the follower shaft;

a parking gear disposed on the follower shaft between the follower pulley and the driver gear;

a park lock mechanism for locking the parking gear; and a control shaft drivingly supporting the park lock mechanism, the control shaft extending through the first reduced container space and having one end portion projecting outwardly from the inwardly recessed portion of the casing;

the driver shaft and the park lock mechanism being disposed within the first reduced container space.

According to another aspect of the present invention, there is provided a park lock arrangement for use in a continuously variable transmission, comprising:

a housing;

an end cover;

a casing having one end portion coupled with the housing and the opposite end portion coupled with the end cover;

a rotatable shaft extending through the housing, the casing and the end cover;

a parking gear mounted on the rotatable shaft;

a park lock mechanism for locking the parking gear; and a control shaft drivingly supporting the park lock mechanism;

the control shaft being rotatably disposed at the one end portion of the casing, the control shaft extending through the casing and having one end portion projecting outwardly from the casing.

DETAILED DESCRIPTION OF THE INVENTION

Figure 2:
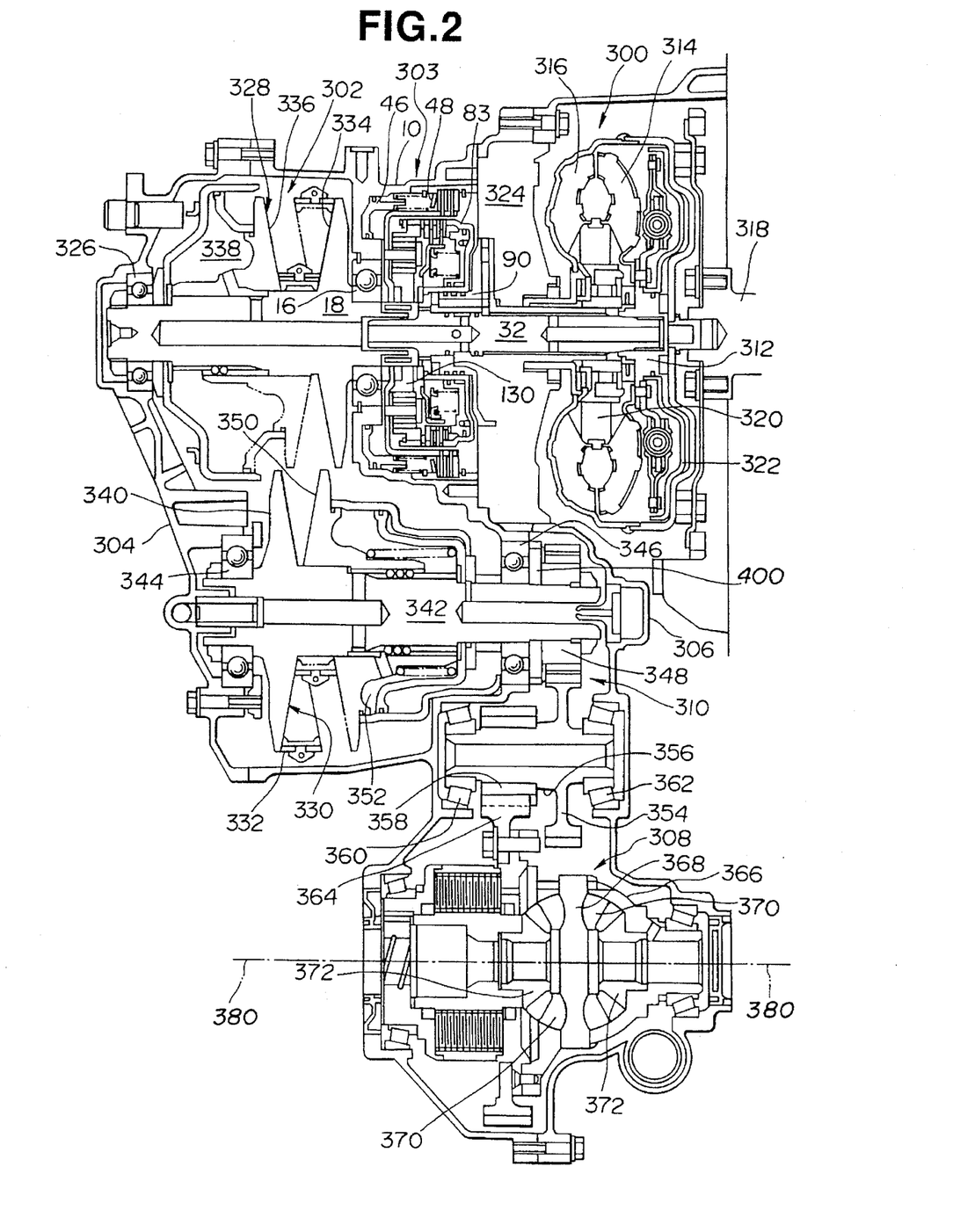
FIG. 2 is a development view taken along the line 2—2 of FIG. 1.

Referring to FIG. 2, there is shown a continuously variable transmission for a vehicle.

As illustrated in FIG. 2, the continuously variable transmission includes a hydrokinetic torque transmitting unit in the form of a torque converter 300, a continuously variable ratio change unit 302, and a direction change planetary gearing 303 disposed between the torque converter 300 and the continuously variable ratio change unit 302. A converter housing 306 accommodates the torque converter 300. A casing 10 has one end portion coupled with the converter housing 306 and the opposite end portion coupled with an end cover 304. The casing 10 serves, not only as a container for the component parts of the planetary gearing 303, but also as a container for the continuously variable ratio change unit 302 in cooperation with the end cover 304. In cooperation with the converter housing 306, the casing 10 serves as a container for a differential 308 and a gear train 310 drivingly disposed between the continuously variable ratio change unit 302 and the differential 308.

The direction change planetary gearing 303 within the casing 10 is adapted to change-over forward and reverse directions. The planetary gearing 303 will be described later in detail.

As viewed in FIG. 2, the planetary gearing 303 has an input shaft 32 extending through a stationary sleeve 90. The input shaft 32 is splined at its righthand end to a turbine runner 314 of the torque converter 300. The torque converter 300 includes, in addition to the turbine runner 314, a pump impeller 316 drivingly connected to an engine crankshaft 318, a stator 320, and a lock-up piston 322. In the conventional manner, the pump impeller 316 is drivingly connected to a pump housed in a pump cover 324. The pump cover 324 includes the stationary sleeve 90.

The planetary gearing 303 has an output shaft 18 coaxial with the input shaft 32. As viewed in FIG. 2, the output shaft 18 has its righthand end portion rotatably supported by a ball bearing 16 on the casing 10 and its lefthand end portion rotatably supported by a ball bearing 326 on the end cover 304, and extends into the end cover 304. The output shaft 18 serves as a driver shaft.

A follower shaft 342 extends in parallel relationship with respect to the driver shaft 18. As viewed in FIG. 2, the follower shaft 342 has one lefthand end portion rotatably supported by a ball bearing 344 on the end cover 304, an intermediate portion rotatably supported by a ball bearing 346 on the casing 10, and the opposite righthand end portion extending beyond the ball bearing 346 further into the converter housing 306. Thus, the follower shaft 342 extends through the converter housing 306, the casing 10 and the end cover 304. Fixedly mounted on the opposite end portion or third portion is a driver gear 348 of the gear train 310.

The continuously variable ratio change unit 302 includes a driver pulley 328 mounted on the driver shaft 18, a follower pulley 330 mounted on the intermediate portion of the follower shaft 342, and a V-belt 332 interconnecting the driver and follower pulleys 328 and 330. The driver pulley 328 includes an axially stationary conical disc 334 integral with and extending radially outwardly from the driver shaft 18, and an axially moveable conical disc 336 slidably mounted on the driver shaft 18. The axially moveable conical disc 336 is mounted for rotation with the driver shaft 18 and arranged in opposed relationship with the axially stationary conical disc 334 and defines a V-shaped pulley groove. The axially moveable conical disc 336 is displaceable in axial direction of the driver shaft 18 in response to an increase in fluid pressure within a driver pulley servo chamber 338 from a first limit position as illustrated by the fully drawn line in FIG. 2 to a second limit position as illustrated by the phantom line in FIG. 2. The follower pulley 330 includes an axially stationary conical disc 340 integral with and radially extending outwardly from the follower shaft 342. The follower pulley 330 includes, in addition to the axially stationary conical disc 340, an axially moveable conical disc 350. The axially moveable conical disc 350 is slidably mounted on the follower shaft 342 although it is mounted for rotation with the follower shaft 342. The axially moveable conical disc 350 is arranged in opposed relationship with the axially stationary conical disc 340 to define a V-shaped groove. The axially moveable conical disc 350 is biased towards the axially stationary conical disc 340 in response to fluid pressure within a follower pulley servo chamber 352. The V-belt 332 is gripped between the conical discs 340 and 350 with a force proportional to load on the engine and speed ratio accomplished by the driver and follower pulleys 328 and 330. The fluid pressure within the follower pulley servo chamber 340 is variable with the engine load and the speed ratio. When the axially moveable conical disc 336 of the driver pulley 328 assumes the first position as illustrated by the fully drawn line in FIG. 2, the axially moveable conical disc 350 of the follower pulley 330 stays in a position as illustrated by the fully drawn line in FIG. 2. Increasing the fluid pressure within the driver pulley servo chamber 338 causes the axially moveable conical disc 336 to move toward the second position as illustrated by the phantom line in FIG. 2. This movement of the conical disc 336 causes the V-belt 332 to move radially outwardly from the driver shaft 18 and radially inwardly toward the follower shaft 342. This radially inward movement of the V-belt 332 causes the V-belt 332 to separate the axially moveable conical disc 350 from the axially stationary conical disc 340. Thus, owing to the tension of the V-belt 332, the axially moveable conical discs 336 and 350 move from the position as illustrated by the fully drawn line in FIG. 2 toward the position as illustrated by the phantom line in FIG. 2.

The gear train 310 includes, in addition to the driver gear 348, an idler gear 354 integral with an idler shaft 356, and a pinion 358 rotatable with the idler shaft 356. The idler shaft 356 extends in parallel relationship with the follower shaft 342 and it is rotatably supported by two taper roller bearings 360 and 362. The taper bearings 360 and 362 are mounted on the casing 10 and the converter housing 306, respectively. The driver gear 348 meshes the idler gear 354. Thus, rotation of the follower shaft 342 causes the pinion 358 to rotate. The pinion 358 meshes with a final gear 364.

The differential 308 includes, in addition to the final gear 364, a differential casing 366 rotatable with the final gear 364, a pinion shaft 368 rotatable with the differential casing 366, a pair of pinions 370 rotatably supported by the pinion shaft 368, and a pair of side gears 372 meshing the pinions 370. Reference numeral 380 denotes left and right axle shafts splined to the side gears 372.

As shown in FIG. 2, a parking gear 400 is fixedly disposed on the follower shaft 342 between the driver gear 348 and the follower pulley 330. Specifically, the parking gear 400 is interposed between the ball bearing 346 and the driver gear 348. Thus, the parking gear 400 is axially spaced from the follower pulley 300 and located in the vicinity of the one end portion of the casing 10 at which the casing 10 is coupled with the converter housing 306. The parking gear 400 has a smaller diameter than the follower pulley 330, as seen in FIG. 2.

Figure 1:
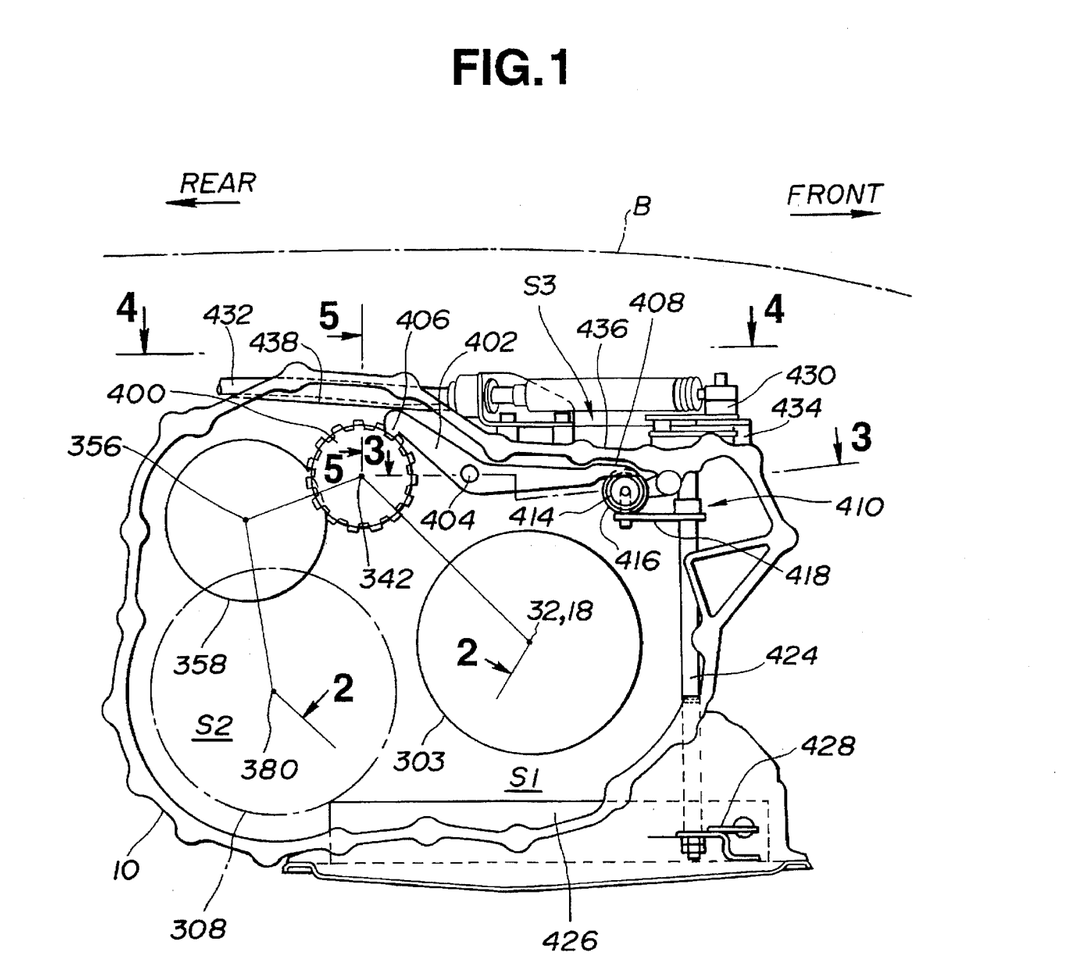
FIG. 1 is a diagrammatic section of a continuously variable transmission taken along one end portion of a casing at which the casing is coupled with a housing, showing a preferred embodiment of a park lock arrangement according to the present invention.
Figure 3:
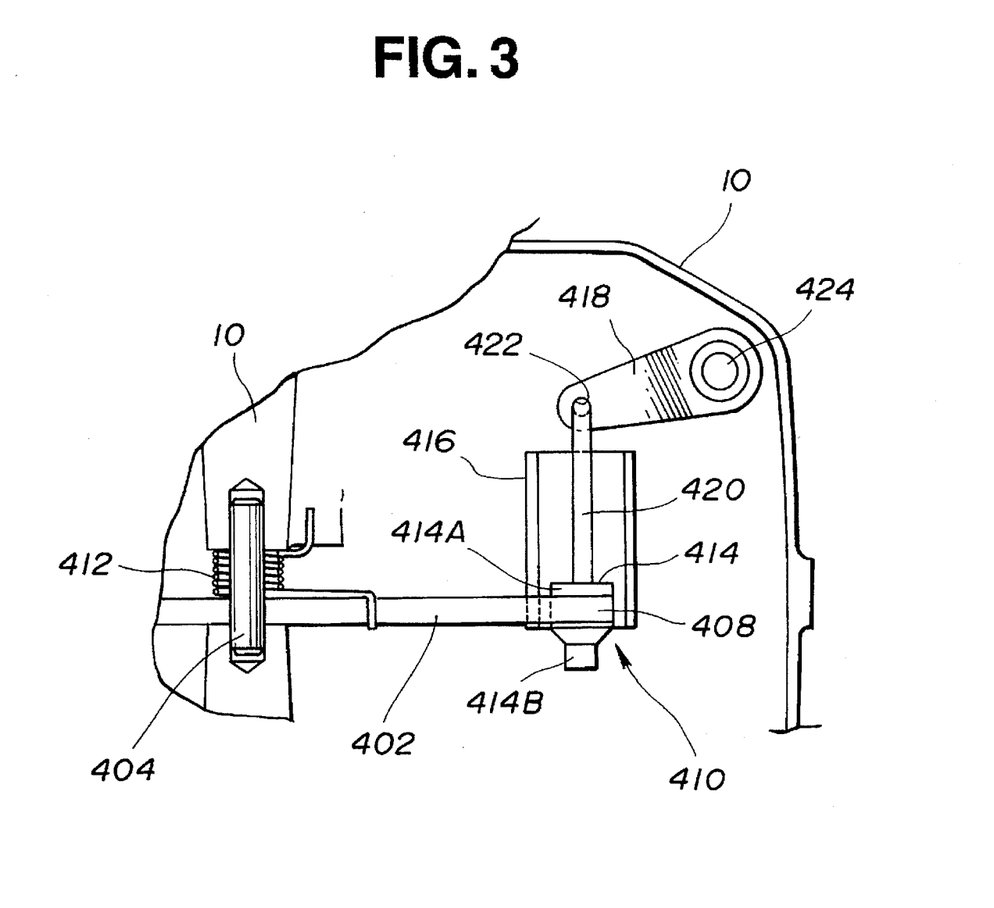
FIG. 3 is a fragmentary section taken along the line 3—3 of FIG. 1.
Figure 4:
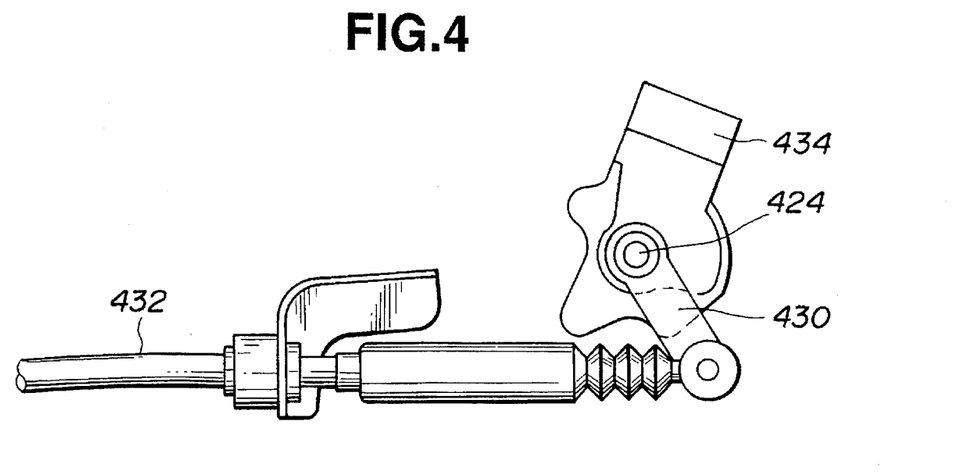
FIG. 4 is an enlarged view taken along the line 4—4 of FIG. 1.

Referring to FIGS. 1, 3 and 4, there is shown a park lock mechanism for locking the parking gear 400 and a control shaft 424 drivingly supporting the park lock mechanism. As illustrated in FIG. 1, the park lock mechanism includes a pawl 402 adapted to engage the parking gear 400. The pawl 402 is pivoted to the casing 10 by a pin 404 shown in FIG. 3. The pawl 402 has a tooth 406 engageable with a gap between adjacent two teeth of the parking gear 400 and a cam follower portion 408 kept in contact with a cam member 414 of an actuator 410. The pawl 402 is biased by a spring 412 shown in FIG. 3, in such a direction, clockwise as viewed in FIG. 1, as to be contacted at the cam follower portion 408 with the cam member 414 of the actuator 410. The cam member 414 is of a generally funnel shape having a first cam surface 414A on an increased diameter annular portion thereof and a second cam surface 414B on a reduced diameter annular portion thereof. The cam member 414 is disposed within a cylindrical guide 416 which has at its upper portion as viewed in FIG. 1, a cutout for allowing a contact between the cam member 414 and the cam follower portion 408 of the pawl 402. The cam member 414 is connected with a parking lever 418 through a rod 420. The rod 420 has a hooked end portion extending downwardly as viewed in FIG. 1, at which the rod 420 is inserted into an opening 422 of a tapered end portion of the parking lever 418 such that the rod 420 is oscillated with respect to the parking lever 418. The parking lever 418 has an enlarged end portion, shown in FIG. 3, secured to an upper portion as viewed in FIG. 1, of the control shaft 424. The control shaft 424 is rotatably supported by the casing 10. Thus, the cam member 414 is reciprocally moved in the cylindrical guide 416 in response to a unitary rotation of the control shaft 424 and the parking lever 418. When the control shaft 424 rotates in such a direction that the first cam surface 414A of the cam member 414 engages the cam follower portion 408 of the pawl 402, the pawl 402 is forced to rotate counterclockwise as viewed in FIG. 1 and then engages the parking gear 400. When the control shaft 424 rotates in the opposite direction, the second cam surface 414B of the cam member 414 engages the cam follower portion 408 of the pawl 402. The pawl 402 is forced to rotate clockwise as viewed in FIG. 1 so that the pawl 402 disengages from the parking gear 400.

The control shaft 424 is located at the one end portion of the casing 10 at which the casing 10 is coupled with the converter housing 306, and at a front portion of the casing 10 as seen in FIG. 1. The control shaft 424 has one or upper end portion as viewed in FIG. 1, rotatably supported by the casing 10 and projects outwardly from the casing 10. The control shaft 424 extends through the inside of the casing 10 and has the opposite or lower end portion as viewed in FIG. 1, rotatably supported by a manual control valve body 426, which is secured to a bottom of the casing 10. The control shaft 424 extends generally vertically relative to the valve body 426. The opposite or lower end portion of the control shaft 424 is connected with a lever 428 to actuate a valve spool in the valve body 426. A control lever 430 is fixed to the one end portion of the control shaft 424, which projects outwardly from the casing 10. As shown in FIGS. 1 and 4, a cable 432 is pivotally connected with the control lever 430 at one end thereof. The cable 432 is connected at the other end thereof to a shift lever disposed in an occupant's compartment and moveable in response a movement of the shift lever. The movement of the shift lever causes a unitary rotation of the control lever 430 and the control shaft 424. Reference numeral 434 denotes an inhibitor switch disposed below the control lever 430.

As illustrated in FIG. 1, the casing 10 has an inwardly recessed portion 436 to define a first reduced container space S1. The input shaft 32 of the planetary gearing 303, the driver shaft 18 coaxial therewith, and the park lock mechanism are disposed within the first reduced container space S1. The casing 10 defines a second container space S2 adjacent the first reduced container space S1 in which the follower shaft 342 and the gear train 310 and the differential 308 are partly disposed. The inwardly recessed portion 436 defines a mounting space S3 outside the casing 10. Reference B denotes a part of a vehicle body. As viewed in FIG. 1, the mounting space S3 extends from an upper surface of the inwardly recessed portion 436 upwardly substantially up to the uppermost level of the casing 10. The first container space S1 and the mounting space S3 are disposed at the front portion of the casing 10 and the second container space S2 is disposed at a rear portion of the casing 10. The driver shaft 18 and the input shaft 32 are arranged within the casing 10 more downwardly as viewed in FIG. 1, than the follower shaft 342 and the idler shaft 356. The control shaft 424 extends through the first reduced container space S1 and the one or upper end portion thereof projects outwardly from the inwardly recessed portion 436. The park lock mechanism, including the pawl 402 and actuator 410, are disposed at an upper part, as viewed in FIG. 1, of the first reduced container space S1, in opposed relationship with the inwardly recessed portion 436 of the casing 10. This arrangement serves for saving a mounting space for the park lock mechanism. The projecting end portion of the control shaft 424, the control lever 430, the pivoted end portion of the cable 432, and the inhibitor switch 434 are disposed on the inwardly recessed portion 436 of the casing 10 and thus within the mounting space S3. This arrangement contributes to space-saving and prevents interference of these components with other components disposed thereabove.

Figure 5:
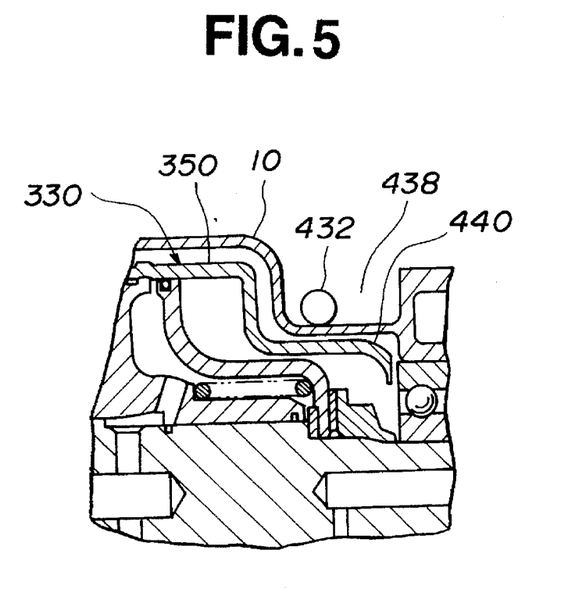
FIG. 5 is a fragmentary section taken along the line 5—5 of FIG. 1.

As illustrated in FIG. 5, a cable guide portion 438 in the form of a groove is disposed on an outer surface of the casing 10 and connected to the inwardly recessed portion 436. A portion of the cable 432 extending beyond the inwardly recessed portion 436 toward the shift lever is received in the cable guide portion 438. The cable guide portion 438 is radially opposed to a cylindrical portion 440 of the follower pulley 330 formed integrally with the axially moveable conical disc 350 and has a reduced diameter.

As will be understood from the preceding description, the park lock arrangement of the invention serves for an easy assembling operation.

It should be noted that the parking gear 400 may be reduced in diameter as compared with the parking gear used in the prior art park lock arrangement formed integrally with the follower pulley with a larger diameter. This reduction of the parking gear diameter contributes to saving of a mounting space for the park lock mechanism.

Figure 6:
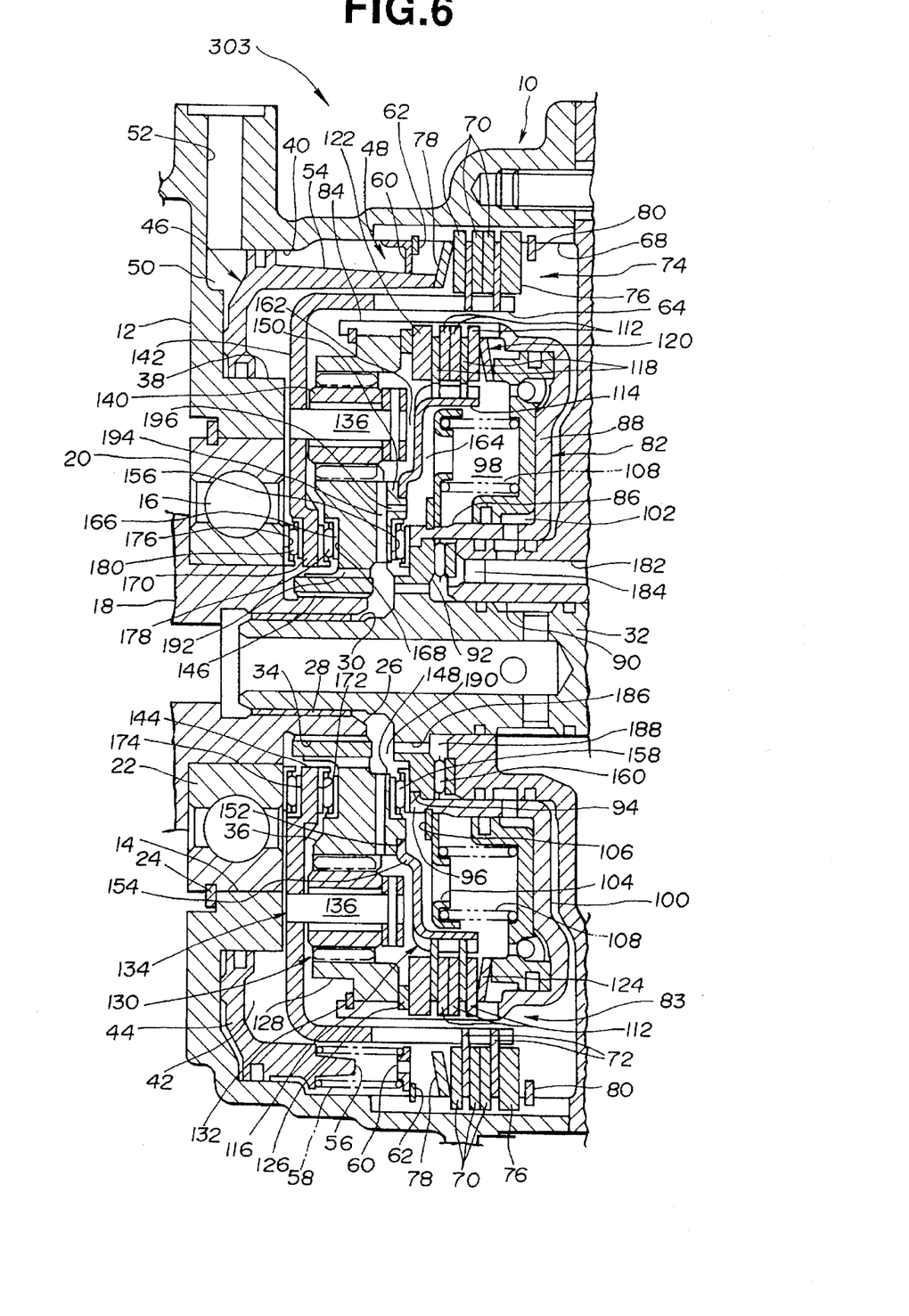
FIG. 6 is a fragmentary section of a change direction planetary gearing of the continuously variable transmission.

The direction change planetary gearing 303 shown in FIG. 6 is substantially the same as described in a copending U.S. Pat. application Ser. No. 08/187,286 filed on Jan. 27, 1994 which is hereby incorporated by reference. Reference is made to FIG. 1 of this Patent Application and the corresponding descriptive part in understanding the detail of the mechanism of the planetary gearing.

Referring to FIG. 6, the casing 10 includes a partition 12 formed with a ball bearing receiving bore 14. Received in this bore 14 is the ball bearing 16 rotatably supporting the output shaft 18. The ball bearing 16 includes an outer race 20 and an inner race 22. The outer race 20 is in engagement with the bore 14 defining a wall and held in position within the bore 14 by means of a snap ring 24 in the conventional manner. The inner race 22 is in engagement with the output shaft 18 in the conventional manner. As viewed in FIG. 6, the output shaft 18 includes a central boss 26 projecting from the righthand axial end thereof. The central boss 26 is formed with a bore 28 for rotatably receiving a reduced diameter end portion 30 of the input shaft 32. The central boss 26 is externally splined at 34 for spline connection with a sun gear 36.

The partition 12 is recessed at a portion radially outwardly spaced from the ball bearing receiving bore 14 to define a cylindrical shoulder 38 and a cylindrical inner wall portion 40. The cylindrical inner wall portion 40 is radially spaced from the cylindrical shoulder 38 to define an annular bore 42 is an annular disc portion 44 of a piston 46 of a reverse brake 48. The annular disc portion 44 has an outer periphery in seal-tight engagement with the cylindrical inner wall portion 40 and an inner periphery in seal-tight engagement with the cylindrical shoulder 38, and defines within the annular bore 42 a brake servo chamber 50. Communicating with this servo chamber 50 is a supply passage 52 drilled through the casing 10. The piston 46 includes, in addition to the annular disc portion 44, a plurality of angularly spaced arm portions, only one being shown at 54 in FIG. 6, and a plurality of angularly spaced spring retainer boss portions, only one being shown at 56 in FIG. 6. The arm portions 54 and spring retainer boss portions 56 are alternatively arranged along the outer periphery of the annular disc portion 44 and projects in parallel and in a direction away from the partition 12. The arm portions 54 extend further than the spring retainer boss portions 56 do. The reverse brake 48 also includes a plurality of return springs, only one being shown at 58 in FIG. 6, and a return spring retainer 60 fixedly mounted to the casing 10 by means of a snap ring 62. The return springs 58 are disposed between the return spring retainer 60 and the corresponding spring retainer boss portions 56 to bias the piston 46 toward a spring set position thereof as illustrated in FIG. 6.

As shown in FIG. 6, the reverse brake 48 includes a cylindrical portion 64. The cylindrical portion 64 is disposed radially inwardly with respect to the arm portions 54 of the piston 46 and radially opposed to a cylindrical inner wall portion 68 defined by the casing 10. This cylindrical inner wall portion 68 is splined to engage a plurality of driven frictional plates 70 by spline connection. The cylindrical portion 64 is splined to engage a plurality of driver frictional plates 72. The driver and driven frictional plates 70 and 72 are interleaved to form a reverse brake frictional plate assembly 74. The reverse brake frictional plate assembly 74 includes, in addition to the driver and driven frictional plates 70 and 72, a retaining plate 76 and a dish plate 78. The retaining plate 76 is spline connected to the cylindrical inner wall portion 68 and held by a snap ring 80. The dish plate 78 is disposed between the leading ends of the arm portions 54 and the adjacent one driven frictional plate 70.

Received in the cylindrical portion 64 is a clutch drum 82 of a forward clutch 83. The clutch drum 82 includes an outer cylindrical portion 84, an inner cylindrical portion 86 and an annular end portion 88 interconnecting the outer and inner cylindrical portions 84 and 86. The inner cylindrical portion 86 is coaxially arranged with respect to the input shaft 32. The input shaft 32 extends through the stationary sleeve 90 and has a radially protruded portion 92. The radially protruded portion 92 is axially spaced From the adjacent axial end of the stationary sleeve 90. The radially protruded portion 92 is formed with a cutout 94 to receive a flange portion 96 extending radially inwardly from the axial end of the inner cylindrical portion 86. The clutch drum 82 is fixedly connected to the input shaft 32 for rotation therewith by welding the inner cylindrical portion 86 to the radially protruded portion 92.

Defined by the outer and inner cylindrical portions 84 and 86 and annular end portion 88 is an annular bore 98 slidably receiving an annular clutch piston 100. The clutch piston 100 has an outer periphery in seal-tight engagement with the outer cylindrical portion 84 and an inner periphery in seal-tight engagement with the inner cylindrical portion 86, and defines within the annular bore 98 a clutch servo chamber 102. A return spring retainer 104 is coupled with the inner cylindrical portion 86 and held by a snap ring 106. A plurality of return springs 108 are disposed between the return spring retainer 104 and the clutch piston 100 to bias the piston 100 towards a spring set position thereof as illustrated in FIG. 6.

The outer cylindrical portion 84 is splined axially inwardly from the leading end thereof to engage externally splined driver frictional plates 112 by spline connection. Disposed radially inwardly of the outer cylindrical portion 84 is a cylindrical portion 114 of a hub 116. The cylindrical portion 114 is splined to engage a plurality of driven frictional plates 118 by spline connection. The driver and driven frictional plates 112 and 118 are interleaved to form a forward clutch frictional plate assembly 120. The forward clutch frictional plate assembly 120 includes, in addition to the driver and driven frictional plates 112 and 118, a retaining plate 122 and a dish plate 124. The retaining plate 122 is spline connected to the outer cylindrical portion 84 and held by a snap ring 126. The dish plate 124 is disposed between the clutch piston 100 and the adjacent one of the driver frictional plates 112.

An internally toothed ring gear 128 of a planetary gear set 130 is externally splined to engage the outer cylindrical portion 84 by spline connection. The ring gear 128 is axially fit to the outer cylindrical portion 84 by a snap ring 132.

The planetary gear set 130 includes, in addition to the sun and ring gears 36 and 128, a pinion carrier 134. The pinion carrier 134 includes a plurality of pinion shafts or spindles 136 and a plurality of pinions 140 rotatably carried by the plurality of spindles 136, respectively. Each of the plurality of pinions 140 meshes the sun and ring gears 36 and 128. All of the spindles 136 are fixedly mounted to a radially extending annular disc portion 142. This annular disc portion 142 has an outer periphery integrally connected to the cylindrical portion 64 and an inner periphery 144. The annular disc portion 142 merges smoothly into the cylindrical portion 64.

As will be readily seen from FIG. 6, the planetary gear set 130 is received in the cylindrical portion 64 and has its ring gear 128 connected to the clutch drum 82 and its pinion carrier 134 connected to the cylindrical portion 64.

As mentioned before, the central boss 28 is spline connected to the sun gear 36. For spline connection to the central boss 26, the sun gear 36 is formed with a splined bore 146 engaging the central boss 26 and an enlarged bore 148 surrounding the reduced diameter end portion 30 of the input shaft 32. The sun gear 36 includes an axially protruding portion 150 defining the enlarged bore 148. The axially protruding portion 150 is formed with an outer peripheral cutout 152 receiving an inner peripheral portion 154 of the hub 116. The axially protruding portion 150 is formed with an inner peripheral cutout 156 receiving a thrust bearing 158. The thrust bearing 158 is disposed between and in rolling contact with the radially protruded portion 92 of the input shaft 32 and the sun gear 36. Disposed between the radially protruded portion 92 and the stationaary sleeve 90 is a thrust bearing 160.

The hub 116, fixedly connected to the sun gear 36 and integral with the cylindrical portion 114, extends in such a manner as to define on the lefthand side, viewing in FIG. 6, adjacent to the pinions 140 a radially extending clearance space 162. On the opposite righthand side, viewing in FIG. 6, the hub 116 defines a space 164 within the clutch drum 82.

As shown in FIG. 6, the radially extending annular disc portion 142 of the pinion carrier 134 is interposed between the ball bearing inner race 22 and the sun gear 36. The sun gear 36 is formed with a recessed portion 166 and includes a radially extending bottom wall 168 partially defining the recessed portion 166. The radially extending annular disc portion 142 is offset at a portion radially spaced from the inner periphery 144 thereof to form an axially displaced inner peripheral portion 170. The axially displaced inner peripheral portion 170 defines on the righthand side, viewing in FIG. 6, a first radially extending wall 172 opposed to the radially extending bottom wall 168 of the recessed portion 166. On the opposite lefthand side, the axially displaced inner peripheral portion 170 defines a second radially extending wall 174 opposed to a radially extending wall 176 of the ball bearing inner race 22. Two thrust bearings, namely a first thrust bearing 178 and a second thrust bearing 180, are so disposed as to prevent mechanical interference between the radially extending annular disc portion 142, partition 12 of the casing 10 and sun gear 36.

Specifically, the first thrust bearing 178 is disposed between and in rolling contact with the radially extending bottom wall 168 and the radially extending wall 172 of the axially displaced inner peripheral portion 170, while the second thrust bearing 180 is disposed between and in rolling contact with the radially extending wall 174 of the axially displaced inner peripheral portion 170 and the radially extending wall 176 of the ball bearing inner race 22.

It should be noted that the recessed portion 166 and the axially displaced inner peripheral portion 170 allow compact arrangement of the thrust bearings 178 and 180 with a clearance between the partition 12 and the radially extending annular disc portion 142 kept minimum. This arrangement contributes much to reduction in axial span or dimension, with respect to the axis of the input shaft 32, of the planetary gearing 303.

Lubrication system for the planetary gearing 303 is now described. The stationary sleeve 90 is formed with a lubrication oil supply passage 182, which is supplied with lubrication oil under pressure. This supply passage 182 is provided with an outlet orifice 184 at a location adjacent to the thrust bearing 160. The radially protruded portion 92 of the input shaft 32 is formed with a plurality of angularly spaced axial lubrication oil passages 186. These axial passages 186 establish fluid communication between an annular space 188 defined between the radially protruded portion 92 and the stationary sleeve 90 and an annular chamber 190 defined within the enlarged bore 148. The sun gear 36 is formed with a plurality of axial lubrication oil passages 192.

Each of the axial passages 192 has one end opening to the annular chamber 190 and the opposite end opening within the radially extending bottom wall 168 of the recessed portion 166 of the sun gear 36. Via these lubrication oil passages 186 and 192, the thrust bearings 158, 178 and 180 are supplied with lubrication oil. The thrust bearing 160 is supplied with lubrication oil at a portion immediately downstream of the orifice 184 of the supply passage 182.

The axially protruding portion 150 of the sun gear 36 is formed with a plurality of radial oil lubrication passages 194. Each of the radial passages 194 has a radially inward inlet end opening to the annular chamber 190 and a radially outward outlet end opening to the radially extending clearance space 162. With these radial passages 194, lubrication oil is thrown radially outwardly towards the clutch frictional plate assembly 120 during rotation of the input shaft 32. This lubrication passage arrangement assures sufficient supply of lubrication oil to the clutch frictional plate assembly 120.

In order to assure sufficient supply of lubrication oil to the space 164 within the clutch drum 82, a plurality of axial ports 196 are drilled through the axially protruding portion 150 of the sun gear 36. These axial ports 196 establish fluid communication at least some of the plurality of radial passages 194 and the space 164 within the clutch drum 82.

What is claimed is:

1. A park lock arrangement for use in a continuously variable transmission, comprising:

a housing;

an end cover;

a casing having one end portion coupled with the housing and an opposite end portion coupled with the end cover, the casing having an inwardly recessed portion defining a reduced container space;

a rotatable shaft extending through the housing, the casing, and the end cover;

a parking gear disposed on the rotatable shaft;

a park lock mechanism for locking the parking gear disposed within the reduced container space;

a control shaft rotatably disposed at the one end portion of the casing and drivingly supporting the park lock mechanism, the control shaft having one end portion projecting outwardly from the casing through the reduced container space; and a cable connected to the control shaft, wherein the casing is formed with a cable guide portion connected to the inwardly recessed portion.

2. A park lock arrangement according to claim 1, wherein the control shaft is located at a front portion of the casing.

3. A park lock arrangement according to claim 1, further comprising a control valve body secured to the casing and supporting an opposite end portion of the control shaft.

4. A park lock arrangement according to claim 1, wherein the park lock mechanism includes a pawl adapted to engage the parking gear, and an actuator operatively connected to the pawl.

5. A park lock arrangement according to claim 4, further comprising a pulley mounted on the rotatable shaft, the pulley including a cylindrical portion with a reduced diameter radially opposed to the cable guide portion.

6. A park lock arrangement for use in a continuously variable transmission, comprising:

a housing;

an end cover;

a casing having one end portion coupled with the housing and an opposite end portion coupled with the end cover, the casing having an inwardly recessed portion defining a first reduced container space inside the casing and a mounting space outside the casing;

a direction change planetary gearing having an input shaft;

a driver shaft coaxial with the input shaft;

a follower shaft extending parallel to the driver shaft, the follower shaft having one end portion rotatably supported on the end cover, an intermediate portion rotatably supported on the casing, and an opposite end portion extending into the housing;

a continuously variable ratio change unit including a driver pulley mounted on the driver shaft, a follower pulley mounted on the follower shaft, and a V-belt interconnecting the driver pulley and the follower pulley;

a differential;

a gear train drivingly disposed between the continuously variable ratio change unit and the differential, the gear train including a driver gear mounted on the opposite end portion of the follower shaft;

a parking gear disposed on the follower shaft between the follower pulley and the driver gear;

a park lock mechanism for locking the parking gear;

a control shaft extending through the first reduced container space and drivingly supporting the park lock mechanism, the control shaft having one end portion projecting outwardly from the inwardly recessed portion of the casing and disposed in the mounting space; and a cable connected to the control shaft, wherein the driver shaft and the park lock mechanism are disposed within the first reduced container space, and wherein the casing is formed with a cable guide portion connected to the inwardly recessed portion.

7. A park lock arrangement according to claim 6, wherein the casing defines a second container space adjacent the first reduced container space in which the follower shaft, the gear train, and the differential are partly disposed.

8. A park lock arrangement according to claim 6, wherein the park lock mechanism includes a pawl arranged to be engageable with the parking gear, and an actuator operatively connected to the pawl.

9. A park lock arrangement according to claim 6, wherein the control shaft is disposed at the one end portion of the casing.

10. A park lock arrangement according to claim 6, wherein the cable is disposed in the mounting space.

11. A park lock arrangement according to claim 6, further comprising a control valve body secured to the casing and supporting an opposite end portion of the control shaft.

12. A park lock arrangement according to claim 6, wherein the follower pulley includes a cylindrical portion with a reduced diameter radially opposed to the cable guide portion.

* * * * *